United States Patent

Albert et al.

[11] Patent Number: 5,971,502
[45] Date of Patent: Oct. 26, 1999

[54] SECONDARY BRAKING CONTROL

[75] Inventors: Timothy Jay Albert, Niles, Mich.; Gregory Paul Goodzey, South Bend, Ind.

[73] Assignee: Robert Bosch Technology Corp, Broadview, Ill.

[21] Appl. No.: 09/090,681

[22] Filed: Jun. 4, 1998

[51] Int. Cl.[6] ................................................ B60T 15/16
[52] U.S. Cl. .................. 303/122.12; 188/358; 303/14; 303/113.2; 303/116.1; 303/DIG. 11; 303/166; 303/10; 303/DIG. 4; 303/155; 303/114.1; 303/113.4
[58] Field of Search .............................. 303/113.2, 113.3, 303/13–14, DIG. 11, DIG. 4, DIG. 3, 116.1, 116.2, 115.1, 115.4, 115.5, 10–12, 122.09, 122.1, 122.12, 122.13, 122.14, 139, 166, 175, 167, 68, 901, 86, 900, 155, 3, 113.1, 113.4, 114.1, 174, 176, 116.4, 117.1, 122.15; 188/358

[56] References Cited

U.S. PATENT DOCUMENTS

| | | | |
|---|---|---|---|
| 4,792,192 | 12/1988 | Tveitane | 303/122.14 |
| 4,902,075 | 2/1990 | Uno et al. | 303/14 |
| 4,950,028 | 8/1990 | Harrison . | |
| 5,013,094 | 5/1991 | Nishii et al. | 188/358 |
| 5,106,170 | 4/1992 | Matsuda et al. . | |
| 5,207,485 | 5/1993 | Tröster | 303/113.2 |
| 5,288,142 | 2/1994 | Burgdorf | 303/116.2 |
| 5,335,981 | 8/1994 | Volz et al. | 303/116.2 |
| 5,342,120 | 8/1994 | Zimmer et al. | 303/116.2 |
| 5,388,896 | 2/1995 | Holland et al. | 303/116.1 |
| 5,411,326 | 5/1995 | Linhoff | 303/116.2 |
| 5,522,650 | 6/1996 | Negrin et al. | 303/10 |
| 5,522,652 | 6/1996 | Negrin et al. | 303/175 |
| 5,669,673 | 9/1997 | Reuter | 303/10 |
| 5,700,067 | 12/1997 | Heubner . | |
| 5,709,438 | 1/1998 | Isakson et al. | 303/114.1 |
| 5,711,584 | 1/1998 | Kawahata | 303/122.12 |
| 5,779,329 | 7/1998 | Takashima | 303/155 |
| 5,797,663 | 8/1998 | Kawaguchi et al. | 303/113.2 |
| 5,826,953 | 10/1998 | Heubner . | |
| 5,845,976 | 12/1998 | Muenster | 303/155 |
| 5,851,057 | 12/1998 | Terazawa et al. | 303/155 |

Primary Examiner—Douglas C. Butler
Attorney, Agent, or Firm—Leo H. McCormick, Jr.; Warren Comstock

[57] ABSTRACT

A secondary source of braking for large hydraulically braked vehicles utilizing the available power source (38) provided by typically available anti-skid and traction control braking systems. The invention improves the time response of a secondary braking traction control system by utilizing stored fluid in the low pressure anti-skid braking system accumulators (34) to provide for faster build of pressure by the pump motor (38). Fluid is stored and utilized based on vehicle behavior and operational states and is based upon the principal the traction control, anti-skid braking and secondary braking requirements are generally mutually exclusive. This allows for a decreased response time of the secondary braking system and also provides for improved initial cycle response of typical traction control events that utilize the system configuration.

5 Claims, 4 Drawing Sheets

SECONDARY BRAKING CONTROL

The present invention relates generally to a power assisted braking system for a vehicle and more particularly to methods and apparatus for optimal control and improved time response of secondary or back-up braking systems.

BACKGROUND OF THE INVENTION

The time-honored skid avoidance technique of "pumping" the brake pedal to control a skid situation has largely been displaced by anti-lock braking systems. Many known anti-lock devices operate by cyclically increasing and decreasing the braking force exerted on the wheels so that a slipping wheel having a tendency to lock is permitted to re-accelerate back to a speed corresponding to the speed of the vehicle. This is typically achieved by control valves alternately allowing fluid to flow out of and then into the brake cylinder to first lower and then raise the brake pressure in the brake system.

Typically, anti-lock or anti-skid braking systems utilize a so-called pump-back scheme or a replenish scheme during a reapply or build operational sequence to maintain a desired level of hydraulic fluid in a brake system. In a pump-back scheme, the same hydraulic fluid is resupplied from a local accumulator to the brake pad actuators while in a replenish scheme hydraulic fluid comes from a separate source such as either a hydraulic accumulator or a separate pump and motor.

Most of such anti-lock braking systems are further capable of operating in a traction control function A traction control function is established by detecting conditions where the rotational speed of a first powered wheel substantially exceeds that of a second powered wheel. To provide a power balance in the operation of a vehicle, a braking force is applied to the powered wheel rotating at a higher speed to effectively transfer driving torque back to that wheel with better traction. Many anti-lock systems having such a traction control feature employ a motor and hydraulic pump or pumps which operate independent of the service braking system. Such a braking system is disclosed in U.S. Pat. No. 5,709,438 where the traction control motor and hydraulic pump are called into action to provide a back-up power assisted braking feature in the event of a malfunction of the primary braking system.

It is desirable to provide a braking control system with a secondary or back-up braking source having a capability of modulating pressure to the service brakes in the event of loss of the primary brake power source.

It is also desirable to provide such a back-up braking system which is capable of rapidly responding to an actuation signal in the event of a malfunction of the primary brake system.

BRIEF SUMMARY OF THE INVENTION

The present invention provides solutions to the above problems in known braking systems by providing a braking control which uses brake pedal input and vehicle wheel speeds or hydraulic pressure to effect secondary or back-up braking in either a static or dynamic control mode. The braking control is incorporated into a typical pump back type anti-skid (ABS) system with traction control (ASR) and an integrated secondary braking system that utilizes the ASR to build pressure in the event of a loss of the primary power source. In the prior art, testing of this type of system typically indicates a long delay time between the actuation of the system and the build up of adequate system pressure. The causes of these delays are associated with the extensive brake line lengths between the master cylinder device and the ABS hydraulic actuator and the wheel brakes. These delays are further amplified by the size of brake typically utilized on vehicles that require this type of secondary braking system. Low pressure accumulators which are normally found in anti-skid systems of this type are also utilized in accordance with the present invention to provide initial hydraulic braking pressure during back-up braking. The present invention works most effective on systems with low pressure accumulators that do not leak during power off situations. This is a situation dependent upon the design of the accumulator, valving hardware and system plumbing strategies. Additional strategies that accommodate for leaking accumulators are feasible and can be incorporated as necessary.

In general, this invention discloses a process for maintaining an optimum level of pressurized hydraulic fluid in a hydraulic accumulator. This optimum level allows the accumulator to immediately receive fluid during an anti-skid braking event and to dispense fluid at the beginning of a back-up braking situation. The process includes a step of monitoring a plurality of vehicle operating parameters such as speed and recent braking activity (hydraulic fluid pressure) and utilizing those monitored parameters to periodically determining the likelihood of the occurrence of an anti-skid braking event. The amount of fluid in the accumulator is increased when the likelihood of an anti-skid braking event is low and is decreased when the likelihood of an anti-skid braking event is high. The likelihood of a traction control event may also be monitored and the amount of fluid in the accumulator increased when the likelihood of an anti-skid braking event is low and the likelihood of a traction control event is high.

Also in general, and in one form of the invention, a power assisted back-up braking system for a vehicle includes a back-up pressurized fluid source and an arrangement for detecting a malfunction in the primary braking system. Upon detecting a malfunction and an operator demand for braking, pressurized hydraulic fluid is substantially immediately initially supplied to brake the vehicle. Subsequently fluid from the source is supplied to supplement the initially supplied fluid.

BRIEF DESCRIPTION OF THE DRAWING

Corresponding reference characters indicate corresponding parts throughout the several views of the drawing.

DESCRIPTION OF THE PREFERRED EMBODIMENT

Figure 1:
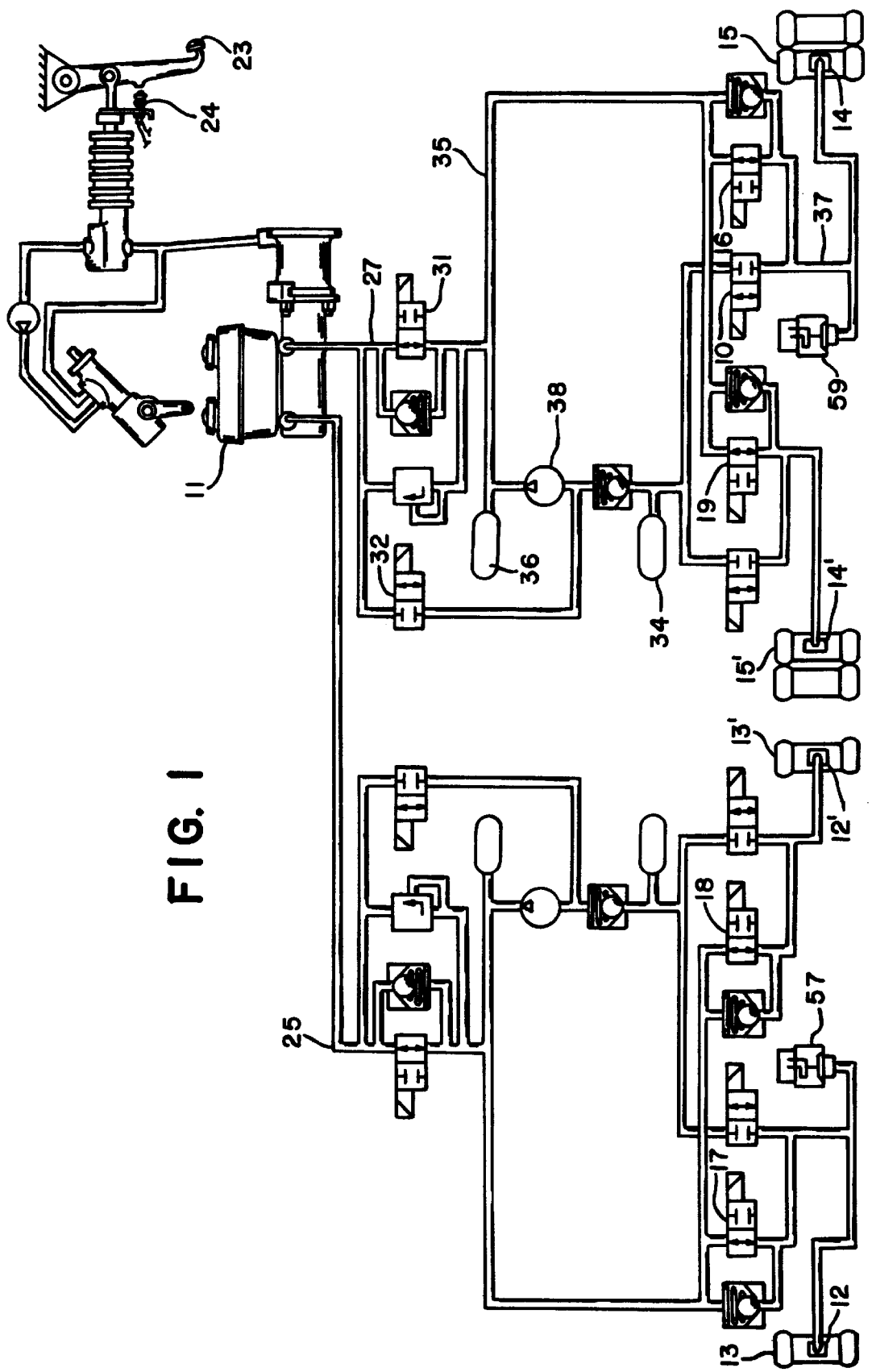
FIG. 1 is a schematic representation of the hydraulic portion of a braking system made according to the principles of this invention.

An anti-lock hydraulic braking system 8 for use with a light truck or similar vehicle is shown schematically in FIG. 1. A rear wheel drive with dual rear tires is illustrated, but the principles of this invention would apply equally to other configurations. The braking system 8 includes solenoid actuated anti-skid valves 10 and 16 located between an operator controlled pressure source or master cylinder 11 and hydraulic brake actuators 12, 12' for the front wheel brakes 13, 13' and hydraulic actuators 14, 14' for the rear wheel brakes 15, 15'. Typically, the pressure source 11 is a conventional master cylinder having two separate circuits, one for the front vehicle wheel brakes 13, 13' and the other for the rear wheel brakes 15, 15'. A suitable pressure source is disclosed in United States copending application Ser. No. 09/015,166 filed Jan. 29, 1998 and assigned to the assignee of the present invention. The vehicle wheels also have rotational speed sensors 53, 55 for providing electrical indications of the angular velocities of individual wheels to an anti-skid electronic control unit.

When the driver wishes to slow the vehicle, the pedal 23 is depressed and hydraulic fluid pressure is transmitted from the master cylinder 11 by way of conduits (brake lines) 25 and 27 to the respective rear and front pairs of brake actuators by way of four individual solenoid actuated anti-skid valves 16, 17, 18 and 19. The individual wheel anti-skid valves such as 16 are normally open to selectively supply braking fluid pressure from the source 11 by way of line 27 to the individual brake actuators such as 12 and 14. Thus, rear wheel braking fluid flow is from the master cylinder 11 via line 27 through valve 31 and line 35 to valves 16, 19 and finally by way of lines 37, 37' to the brake actuators 14, 14' during normal braking. A similar normal braking fluid flow path exists for the brake actuators 12, 12' for the front wheel brakes 13, 13'. Valves such as 10 and 16 function as build and hold valves supplying braking fluid pressure from either line 27 during normal braking or from the accumulator 34 during anti-skid or traction control operation. In some installations, the brake lines 25 and 27 may be rather lengthy, perhaps 10 to 12 feet, leading to delays in the application of back-up braking force.

Under normal operation when the secondary or back-up system is required as indicated, for example, by a signal for braking indicated by switch 24, but no resulting braking force, two hydraulic valves are actuated. The first valve, such as 32 is commonly known as an ASV and opens to provide a fluid source path from the master cylinder 11 to the inlet of the pumps such as 38. The second valve, such as 31 is commonly known as a USV and closes to permit the build up of hydraulic pressure by the pumps in the braking circuits and accumulators such as 36. This same technique is applied to both secondary braking and standard ASR (traction control) modes. The front and rear 38 pumps may share a common motor if desired. The delay time occurs as the pump must draw fluid from the master cylinder to the pump inlet and then out to the brakes 13, 13', 15, 15'. Significant improvements can be realized via a strategy which stores fluid in the ABS low pressure accumulators such as 34 for use during secondary braking and/or ASR modes. The primary function of the low pressure accumulators is to absorb excess fluid during an ABS event. This excess fluid typically occurs for only brief periods and helps prevent wheel locking during low coefficient of friction (mu) events. Anti-skid, traction control and secondary braking are mutually exclusive functions so the use of the accumulators for differing purposes is feasible. For example, when accelerating from a relatively low speed, an anti-skid event is unlikely, but a traction control event is reasonable likely. On the other hand, while cruising along on a highway, the probability of a traction control event is low. If the brakes are applied while cruising down the highway, the probability of an anti-skid event increases.

During stationary vehicle modes of operation, brake fluid is stored in the low pressure accumulators such as 34 in a quantity that will permit partial filling of the brake calipers associated with actuators 12, 12', 14, 14'. In the event the secondary system is required, the pump 38 utilizes this immediately available fluid first to start building pressure and then, during the mode, augments the supply from the master cylinder 11 through the ASV valve such as 32. Delays caused by line lengths and other inefficiencies are eliminated. This mode also is beneficial for ASR (traction control) as most of these events typically occur during initial acceleration. Once the vehicle is moving and other conditions are recognized that no longer require this mode the pump such as 38 may be actuated and accumulators such as 34 cleared of any remaining fluid so optimal ABS (anti-skid) operation is ensured. The other required control strategy involves the recognition and execution of a mode whereby the accumulators are charged with fluid for storage during idle and power off states as described subsequently in conjunction with FIG. 4.

Figure 2:
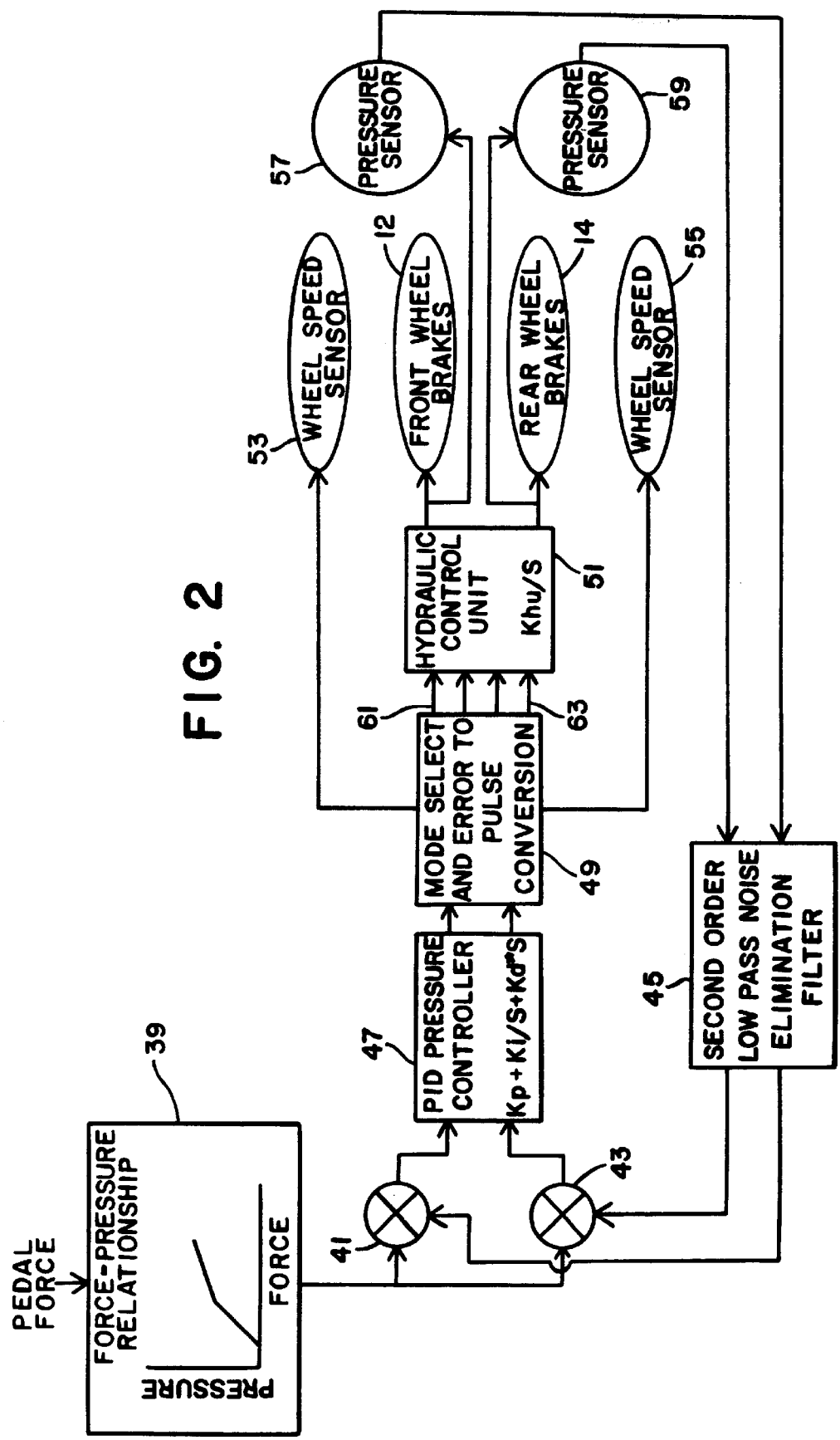
FIG. 2 is a schematic representation of the control arrangement for the braking system of FIG. 1.

The normal mode of braking and anti-skid operation is illustrated by the control circuitry of FIG. 2. As in FIG. 1, there are separate but substantially identical front and rear braking circuits. Depression of pedal 23 is converted at 39 to a target or commanded hydraulic pressure. The actual hydraulic pressure is monitored at 57 and 59, and these measured values are passed through a low pass noise eliminating filter 45 and then compared at 41 and 43 with the commanded pressure. Filter 45 may, for example, have a cut-off frequency of about 10 Hz. Pressure error indicative signals for the front and rear braking circuits are supplied to the PID controller 47. Controller 47 has the transfer function $Kp+Ki/S+Kd*S$ and functions to combine the current error, previous error and the derivative of the error to generate a pair of signals indicative of the required error corrections. These error corrections are converted at 49 to build and decay control signals on the output lines such as 61 and 63. These build and decay outputs are constant pulse width with the spacing between pulses varied as required. Integrals of the build and decay pulse trains are generated at 51 which unit actually controls the solenoids for valves such as 10 and 16.

Figure 3:
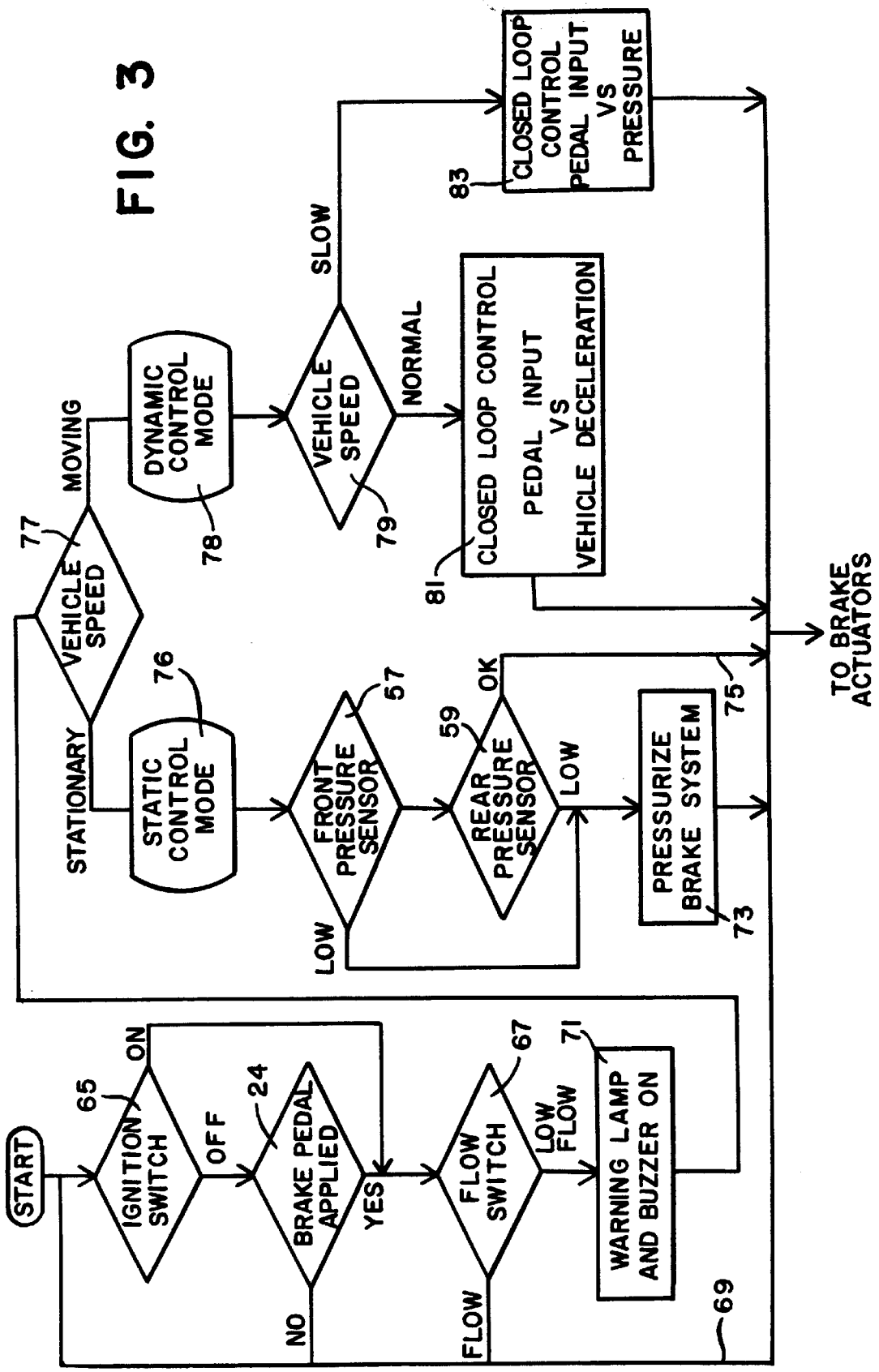
FIG. 3 is a functional block diagram describing the several modes of operation of the braking system of FIGS. 1 and 2.

The several modes of operation of the system are best described in conjunction with FIG. 3. With the ignition switch 65 on and the brake pedal 23 depressed as indicated by pedal switch 24, flow switch 67 measures hydraulic fluid flow from booster 11 to define a signal on line 69 to indicate if the flow is adequate or at a predetermined rate sufficient to apply the wheel brakes 13, 13', 15, 15'. In the event of a pump or engine failure, flow switch 67 provides a low flow signal to enable the warning lamp and buzzer 71 and to initiate a check of the vehicle speed at 77 from one of the wheel speed sensors 53 or 55. If the vehicle is stationary, the system enters the static control mode 76. The front and rear pressure sensors 57 and 59 are checked for adequate pressure. If either is low, the pumps such as 38 are enabled as indicated at 73 to build up the pressure and apply the brakes. If both front and rear pressure is adequate, a signal on line 75 is sent to actuators 12, 12', 14, 14' to effect a brake application. If the vehicle is moving, the system enters the dynamic control mode 78. If there has been a malfunction, the wheel speed from either sensor 53 or 55 is again sensed at 79. If the speed is normal, say greater than 10 MPH, closed loop back-up control is initiated at 81 wherein the pedal input is compared to the actual vehicle deceleration. In this mode, in essence, the wheel speed as sensed by either sensor 53 and 55 is fed back through filter 45 and compared to the output of 39. If the speed as sensed at 79 is slow, say less than 10 MPH, then closed loop control braking is performed as shown in FIG. 2 with pedal input being compared to the hydraulic pressure as indicated at 83.

Figure 4:
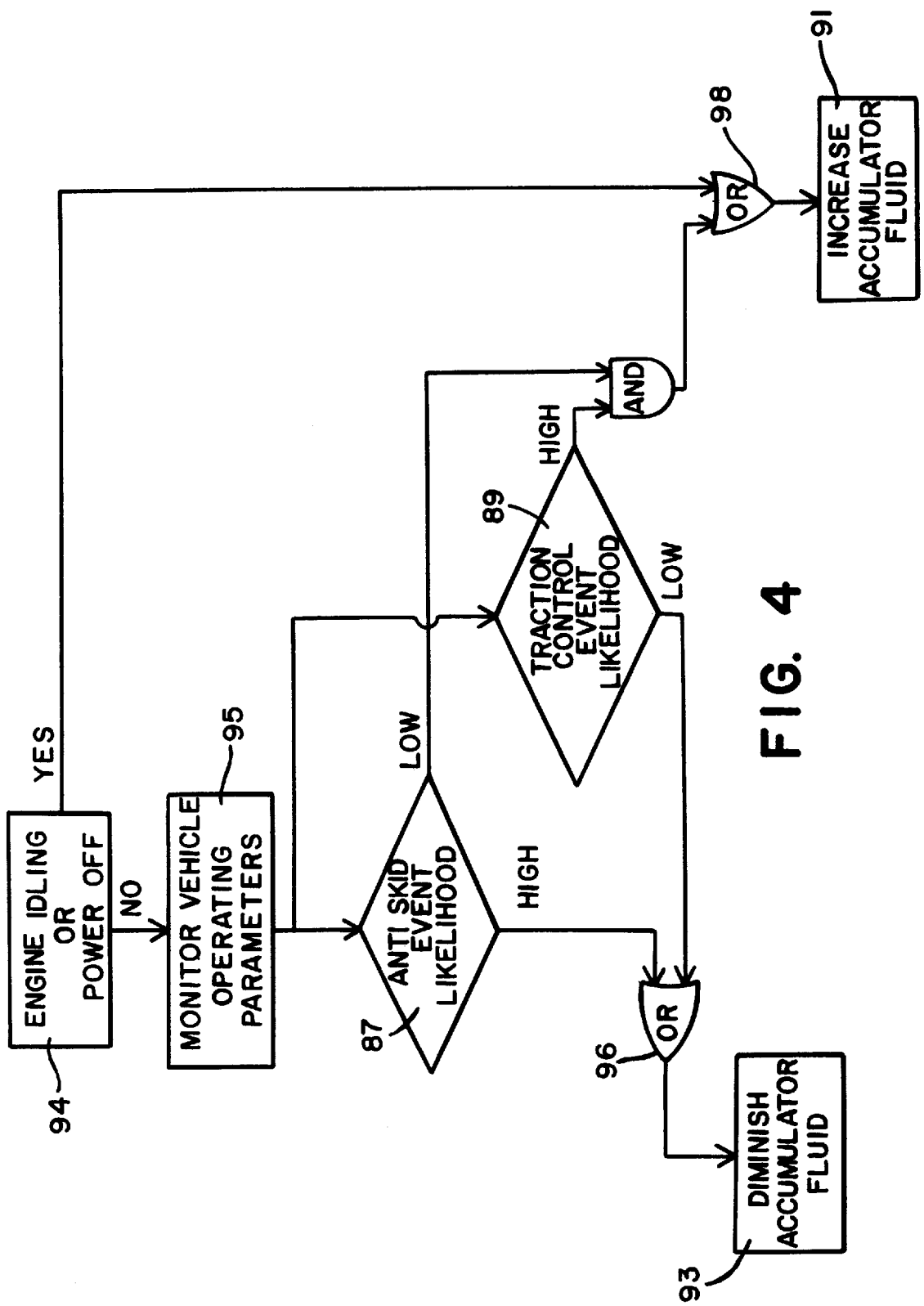
FIG. 4 is a functional block diagram illustrating the steps involved in maintaining an optimum fluid supply in an accumulator.

In FIG. 4, a comparison 94 is made to determine whether the engine is idling or the ignition is off. If either condition prevails, the fluid stored in the accumulators such as 34 is increased as indicated at 91. Otherwise, current vehicle speed, recent history of speed and other operating parameters are monitored at 95 and an estimate of the likelihood of an anti-skid event being evoked is made at 87. Similarly, an estimate of the likelihood of a need for traction control is made at 89. If the first estimate is low and the second is high, as indicated by the output of the AND gate, the likelihood of needing the accumulator such as 34 for an anti-skid event in the near future is low and that accumulator may be used to store pressurized fluid as indicated at 91 for initial back-up braking or a traction control event if called for. If the first estimate is high or the second is low as indicated by the output of the OR gate 96, it is likely the accumulators such as 34 will be needed for an anti-skid event and the fluid should be at least partly removed as indicated at 93. The accumulator contents may be periodically incremented and decremented as called for by the outputs of the AND and OR gates, or it may be completely filled and emptied.

The present invention has been described in the environment of copending U.S. application Ser. No. 09/090,683, filed Jun. 4, 1998 and assigned to the assignee of the present application, however, it will be understood that the invention could easily be incorporated into other braking systems such as the system of the aforementioned U.S. Pat. No. 5,709,438 for example.

What is claimed is:

1. The process of maintaining an optimum level of pressurized hydraulic fluid in a hydraulic accumulator to receive fluid during an anti-skid braking event and to dispense fluid at the beginning of a back-up braking event comprising the steps of:

monitoring a plurality of vehicle operating parameters;

periodically determining the likelihood of an anti-skid braking event occurring based on the monitored parameters;

increasing the amount of fluid in the accumulator when the likelihood of an anti-skid braking event is low; and decreasing the amount of fluid in the accumulator when the likelihood of an anti-skid braking event is high.

2. The process of claim 1 including the additional steps of:

periodically determining the likelihood of a traction control event occurring based on the monitored parameters;

increasing the amount of fluid in the accumulator when the likelihood of an anti-skid braking event is low and the likelihood of a traction control event is high; and decreasing the amount of fluid in the accumulator when the likelihood of an anti-skid braking event is high or the likelihood of a traction control event is low.

3. The process of claim 1 including the additional steps of monitoring for engine off or engine idling conditions, and increasing the amount of fluid in the accumulator when an engine off or engine idling condition is sensed.

4. A power assisted back-up braking system for a vehicle having a primary braking system including:

sensor means for detecting a malfunction in said primary braking system;

pump means for providing pressurized fluid for use in said primary braking system;

a source of stored pressurized fluid; and means operable upon said sensor means detecting a malfunction and an operator demand for braking for initiating communication of pressurized fluid from said stored source to said pump means to supplement the pressurized fluid developed by said pump means and immediately supply pressurized fluid at a level to effect said demand for braking the vehicle.

5. The braking system of claim 4 wherein said means for initiating communication of pressurized hydraulic fluid comprises a plurality of hydraulic fluid accumulators normally operable during anti-skid braking.

* * * * *